(12) United States Patent
Diels et al.

(10) Patent No.: US 9,726,472 B1
(45) Date of Patent: Aug. 8, 2017

(54) INTRACAVITY FIBER SENSORS

(71) Applicant: STC.UNM, Albuquerque, NM (US)

(72) Inventors: Jean-Claude Diels, Albuquerque, NM (US); Ladan Arissian, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 130 days.

(21) Appl. No.: 14/552,016

(22) Filed: Nov. 24, 2014

Related U.S. Application Data

(60) Provisional application No. 61/907,573, filed on Nov. 22, 2013.

(51) Int. Cl.
*G01B 9/02* (2006.01)
*H01S 3/106* (2006.01)
*H01S 3/086* (2006.01)
*H01S 3/067* (2006.01)

(52) U.S. Cl.
CPC ..... *G01B 9/02049* (2013.01); *G01B 9/02015* (2013.01); *H01S 3/1062* (2013.01); *H01S 3/06712* (2013.01); *H01S 3/086* (2013.01)

(58) Field of Classification Search
CPC ........ G01N 2021/7779; H01S 3/06712; H01S 3/06791; H01S 3/086; H01S 3/1062; G01B 9/02092; G01B 9/02049; G01B 9/02015
See application file for complete search history.

(56) References Cited

U.S. PATENT DOCUMENTS

| | | | | |
|---|---|---|---|---|
| 8,384,991 | B2 | 2/2013 | Kieu et al. | |
| 8,446,592 | B1* | 5/2013 | Arissian | G01B 9/02003 356/484 |
| 2001/0014107 | A1* | 8/2001 | Tuennermann | H01S 3/105 372/26 |
| 2007/0052969 | A1* | 3/2007 | Huignard | G01J 9/02 356/460 |
| 2009/0238218 | A1* | 9/2009 | Yao | H01S 3/1308 372/20 |
| 2012/0051375 | A1* | 3/2012 | Karpushko | H01S 3/08036 372/22 |
| 2012/0093179 | A1* | 4/2012 | Dunn | H01S 3/0823 372/21 |

OTHER PUBLICATIONS

Arissian, L., et al., "Multiple quantum webs for ring and linear lasers with long lifetime gain", Solid State Lasers XIV: Technology and Devices, Proceedings of the SPIE, vol. 5707, (2005), 295-301.
(Continued)

*Primary Examiner* — Michael P Lapage
(74) *Attorney, Agent, or Firm* — Schwegman Lundberg & Woessner, P.A.

(57) ABSTRACT

Apparatus, systems, and methods of operating a fiber laser having polarization-preserving fibers can be applied as a sensor to detect a physical quantity. In various embodiments, polarization-preserving fibers can provide a laser cavity having an interferometer disposed in the laser cavity. In various embodiments, a fiber optical parametric oscillator can include an interferometer disposed in the cavity of the optical parametric oscillator. Additional apparatus, systems, and methods are disclosed.

11 Claims, 7 Drawing Sheets

(56) References Cited

OTHER PUBLICATIONS

Arissian, Ladan, et al., "Intracavity phase measurement towards sub nanometer resolution", OSA/ASSP, (2009), 3 pgs.

Arissian, Ladan, et al., "Investigation of carrier to envelope phase and repetition rate: fingerprints of mode-locked laser cavities", Journal of Physics B: Atomic, Molecular and Optical Physics 42, 183001, (2009), 1-25.

Biegert, J, et al., "Compression of pulses of a few optical cycles through harmonic conversion", Journal of Optical Society B, vol. 18, No. 8, (2001), 1218-1826.

Biegert, Jens, et al., "Pulse Compression", Encyclopedia of RF and Microwave Engineering vol. 4, (2005), 3915-3925.

Bohn, M, et al., "Optimizing the frequency in dithered laser gyroscopes", Optics Communications, 213(4-6), (Dec. 2002), 331-7.

Bohn, Matthew J, et al., "Bidirectional Kerr-lens mode-locked femtosecond ring laser", Optics Communications 141, (Aug 15, 1997), 53-58.

Bohn, Matthew J, et al., "Measuring intracavity phase changes by use of double pulses in a linear cavity", Optics Letters, 22(9), (1997), 642-44.

Bohn, Matthew John, "The Ti:sapphire Ring Laser Gyroscope", Dissertation University of New Mexico, (May 1998), 153 pgs.

Braga, A., et al., "Bidirectional mode-locked fiber ring laser using self-regenerative, passively controlled, threshold gating", Optics Letters, 35(15), (2010), 2648-2650.

Dennis, Michael L, et al., "Femtosecond ring dye laser: a potential new laser gyro", Optics Letters, 16(7), (Apr. 1991), 529-531.

Desalvo, R., et al., "Self-focusing and self-defocusing by cascaded second-order effects in KTP", Optics Letters vol. 17, No. 1, (Jan 1, 1992), 28-30.

Desalvo, Richardc, et al., "Infrared to Ultraviolet Measurements of Two-Photon Absorption and n2 in Wide Bandgap Solids", IEEE Journal of Quantum Electronics vol. 32, No. 8, (Aug. 1996), 1324-1333.

Diddams, Scott, et al., "Differential intracavity phase spectroscopy of a three-level system in samarium", Phys Rev A, 58, 3, (1998), 2252-64.

Diddams, Scott, et al., "Frequency locking and unlocking in a femtosecond ring laser with application to intracavity phase measurements", Applied Physics B 63: Lasers & Optics, (1996), 473-480.

Diels, J.-C., et al., "Definitions and Control of the CEP and CEO", Strong Field and Attosecond Physics. Laser Physics vol. 20, No. 5, (2010), 1038-1043.

Diels, Jean-Claude, et al., "", Ultrashort Laser Pulse Phenomena Second Edition: Fundamentals Techniques, and Applications on a Femtosecond Time Scale, Academic Press, Elsevier, (2006), 10 pgs.

Diels, Jean-Claude, et al., "Differential beat note interferometry in linear lasers with two pulses/cavity round-trip", Photonics North, (2008), 2 pgs.

Dietel, W., et al., "Intracavity pulse compression with glass: a new method of generating pulses shorter than 60 fsec", Optics Letters vol. 8, No. 1, (Jan. 1983), 4-6.

Dudly, J. M, et al., "Characteristics of a noncritically phasematched Ti:sapphire pumped femtosecond optical parametric oscillator", Optics Communications 104, (Jun. 22, 1993), 419-430.

Fontaine, J. J, et al., "Chirp in Mode-Locked Ring Dye Laser", IEEE Journal of Quantum Electronics vol. QE-19, No. 10, (Oct. 1983), 1467-1469.

Hanschii, Theodor W, et al., "Ultrasensitive Response of a CW Dye Laser to Selective Extinction", Journal of Quantum Electronics vol. QE-8, No. 10, (Oct. 1972), 802-804.

Hutchings, D. C, et al., "Kramers-Krönig relations in nonlinear optics", Optical and Quantum Electronics 24, (1992), 1-30.

Jamasbi, Nooshin, et al., "Study of a Linear Femtosecond Laser in Passive and Hybrid Operation", Journal of Modern Optics, 35:12, (1988), 1891-1906.

Jones, R J, et al., "Stabilization of the frequency, phase and repetition rate of an ultas-short pulse train to a Fabry-Pero reference cavity", Optics Comm, 175, (2000), 409-18.

Jones, R. Jason, et al., "Solid-state laser gyro using ZnS for Kerr-lens mode locking", Summaries of papers presented at the Conference on Lasers and Electra-Optics, 1998. CLEO 98, Technical Digest., (1998), 434.

Kieu, K., et al, "All-fiber bidirectional passively mode-locked ring laser", Optics Letters, 33(1), (2008), 64-66.

Kieu, Khanh, et al., "Femtosecond laser pulse generation with a fiber taper embedded in carbon nanotube/polymer composite", Optics Letters vol. 32, No. 15, (Aug. 1, 2007), 2242-2244.

Lai, Ming, et al., "Nonreciprocal measurements in femtosecond ring lasers", Optics Letters, 17(21), (Nov. 1, 1992), 1535-1537.

Liu, Xiang, et al., "High-energy pulse compression by use of negative phase shifts produced by the cascade X(2):x(2) nonlinearity", Optics Letters vol. 24, No. 23, (Dec 1, 1999), 1777-1779.

Lui, Xuan, et al., "Carrier to Envelop Offset coupling via Multiple Quantum Wells", OSA/CLEO/QELS, (2010), 2 pgs.

Luo, Xuan, et al., "Differential mode-locked cavity for measurements of minute displacements", OSA/CLEO/IQEC, (2009), 2 pgs.

Luo, Xuan, et al., "Group and phase velocity coupling of colliding pulses in a nanostructure", Optics Letters vol. 36, No. 19, (Oct. 1, 2011), 3885-3887.

Luo, Xuan, et al., "Stability analysis of an intracavity pumped OPO", CLEO Technical Digest OSA, (2013), 2 pgs.

Meng, Xianmei, et al., "Bidirectional, synchronously pumped, ring optical parametric oscillator", Optics Letters vol. 26, No. 5, (Mar. 1, 2001), 265-267.

Meng, Xianmei, et al., "Intracavity pumped optical parametric oscillator bidirectional ring laser as a differential interferometer", Optics Communications 233, (2004), 167-172.

Murray, E. D, et al., "Effect of lattice anharmonicity on high-amplitude phonon dynamics in photoexcited bismuth", Physical Review B 72 060301 (R), (2005), 1-4.

Naganuma, Kazuroni, et al., "50-fs pulse generation directly from a colliding-pulse mode-locked Ti:saphire laser using an antiresonant ring mirror", Optics Letters vol. 16, No. 10, (May 15, 1991), 738-740.

Navarro, M., et al., "Mode-locked ring lasers for the backscattering measurement of mirrors", Optics Letters, 31(19), (2006), 2864-2866.

Pound, R. V, et al., "Apparent Weight of Photons", Physical Review Letters vol. 4, No. 7, (Apr. 1, 1960), 337-341.

Quintero-Torres, R, et al., "Scatterometer using a bidirectional ring laser", Optics Communications, 241(1-3), (Nov. 1, 2004), 179-183.

Reid, D. T, et al., "Light-emitting diodes as measurement devices for femtosecond laser pulses", Optics Letters vol. 22, No. 4, (Feb. 15, 1997), 233-235.

Rosales-Garcia, Andrea, et al., "Highly-sensitive Measurements of Changes in Density and Refractive Index of Air using Fiber Laser Polarization Mode Beating Techniques", OSA/CLEO/QELS, (2010), 2 pgs.

Rosales-Garcia, Andrea, et al., "Single Polarization-Mode-Beating Frequency Fiber Laser", IEEE Photonics Technology Letters vol. 21, No. 8, (Apr. 15, 2009), 537-539.

Ruddock, I. S, et al., "Bandwith-limited subpicosecond pulse generation in mode-locked cw dye lasers", Applied Physics Letters vol. 29, No. 5, (Sep. 1, 1976), 296-297.

Schmitt-Sody, A., et al., "IntraCavity Mode Locked Laser Magnetometer", Optics Comm. 283, (2010), 3339-3341.

Schmitt-Sody, A., et al., "Optical Magnetic Field Detection: Intracavity Phase Interferometry'", OSA/UP, (2010), 2 pgs.

Shelby, R. M, et al., "Generation of Pulsed Squeezed Light in a Mode-Locked Optical Parametric Oscillator", Appl. Phys. B 55, (1992), 226-232.

Siegman, A E, "An Antiresonant Ring Interferometer for Coupled Laser Cavities, Laser Output Coupling, Mode Locking, and Cavity Dumping", IEEE Journal of Quantum Electronics: Correspondence, (1973), 247-250.

Stover, John, "", Optical Scattering: Second Edition, Spie Optical Engineering Press, (1995), 7 pgs.

(56) References Cited

OTHER PUBLICATIONS

Tsung-Hai, Wu, et al., "Low noise erbium fiber fs frequency comb based on a tapered-fiber carbon nanotube design", Optics Express vol. 19, No. 6, (Mar. 7, 2011), 5313-5318.
Udem, TH., et al., "Absolute Optical Frequency Measuremeent of the Celsium D1 Line with a Mode-Locked Laser", Physical Review Letters vol. 82, No. 18, (May 3, 1999), 3568-3571.
Udem, TH., et al., "Accurate measurement of large optical frequency differences with a mode-locked laser", Optics Letters vol. 24, No. 13, (Jul. 1999), 881-883.
Vanherzeele, Herman, et al., "Tunable passive colliding-pulse mode locking in a linear dye laser", Optics Letters vol. 9, No. 12, (549-551), Dec. 1984.
Velten, A., et al., "Instaboilities in intracavity pumped optical parametric oscillators and methods of stabilization", Applied Physics B, 98, (2010), 13-25.
Velten, A., et al., "Precise Intracavity Phase Measurement in an Optical Parametric Oscillator With Two Pulses Per Cavity Round-Trip", Optical Letters, vol. 35, No. 8, (2009), 1181-1183.
Wachman, D C, et al., "Continuous-wave mode-locked and dispersion-compensated femtosecond", Opt. Lett., No. 15, vol. 2, (1990), 136-138.
Zavadilova, Z., et al., "Picosecond optical parametric oscillator pumped synchronously, intracavity, by a mode-locked Nd:YVO4 laser", Laser Phys. Lett. 4(2), (2007), 103-108.

\* cited by examiner

INTRACAVITY FIBER SENSORS

RELATED APPLICATION

This application claims priority under 35 U.S.C. 119(e) from U.S. Provisional Application Ser. No. 61/907,573, filed 22 Nov. 2013, which application is incorporated herein by reference.

FIELD OF THE INVENTION

This invention relates generally to lasers and measurements using lasers.

BACKGROUND

Interferometry has been a tool for precision measurement long before the invention of lasers. It involves comparing two paths (sample and reference) of single frequency or multi-color light. The result of the phase measurement, as in the Michelson interferometer, is observed as an amplitude modulation of interfering beams. The use of resonator based laser sensors results in a substantial sensitivity improvement, based on their quality factor ("Q"). A physical quantity (e.g., a stress in a fiber or in a waveguide, change in molecular state in a high quality Fabry-Perot, etc) that changes the phase of a resonator, is monitored with a change of its transmission. The sensitivity to the phase change is Q-times higher than the conventional interferometer due to the sharp resonance feature in a resonator, which implies repeated passage through the phase perturbation.

A fiber laser has features that make it very promising for intracavity phase interferometry (IPI) implementation for optical measurement. Its obvious potential advantages over the free space competitors are compactness and good wall-plug efficiency. In addition, Fresnel drag cannot interfere with the measurement if there is no free path in air. There have been preliminary demonstrations that suggest that this approach is practical. Bidirectional ring laser with a beat note response was demonstrated. A fixed carbon nanotube saturable absorber has been implemented to ensured mode-locking and fixed crossing point. A relatively large dead band limits the applicability of this configuration. Improvement of various designs can enhance the accuracy and precision of measurement by IPI.

BRIEF DESCRIPTION OF THE FIGURES

Embodiments of the invention are illustrated by way of example and not limitation in the figures of the accompanying drawings in which.

DESCRIPTION

The following detailed description refers to the accompanying drawings that show, by way of illustration, various example embodiments of the invention. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, fibers can be implemented in a variety of devices. Implementations using fibers can provide enhanced implementations to different methods and apparatus. For example, using fibers can provide variations to implementations with respect to methods and apparatus disclosed in U.S. Pat. No. 8,446,592, which is herein incorporated by reference in its entirety.

Embodiments of the invention can include a fiber laser operating in pulsed mode, in two orthogonally polarized modes. The fiber laser can be terminated by a small resonator, which can provide a basis for a sensor. The small resonator may be a Michelson type resonator. The fiber laser can be operated with all polarization preserving elements, including the fibers. A saturable absorber can be implemented in the laser cavity to provide operation in which two pulses circulate independently in the laser cavity. A saturable absorber may be realized by a portion of tapered fiber, coated with carbon nanotubes. With respect to such an element, U.S. Pat. No. 8,384,991 ("Saturable absorber using a fiber taper embedded in a nanostructure/polymer composite and lasers using the same") is herein incorporated by reference in its entirety.

For a fiber laser having an interferometer disposed in the laser cavity and propagating two pulses, as taught herein, a reference pulse propagates through a common portion of the laser cavity and one branch of the interferometer disposed in the laser cavity. The other pulse propagates through the common portion of the laser cavity and the other branch of the interferometer, which is the sensor branch. As noted, both branches of the interferometer are part of the laser cavity. The pulse trains emitted by this fiber laser operating in double pulse mode can be made to interfere on a detector, where the detector would "see" an alternating signal at a frequency proportional to the difference in optical length of the two branches of the interferometer.

The fiber sensor arranged in such a manner can detect a physical quantity that modifies the optical lengths of the cavity: physical length, electric field, magnetic field, index of refraction (linear and non-linear), biological substances that attach on the fiber, temperature changes, and other modifiers. The sensitivity to displacement can be as small as 0.1 femtometers.

Figure 1A:
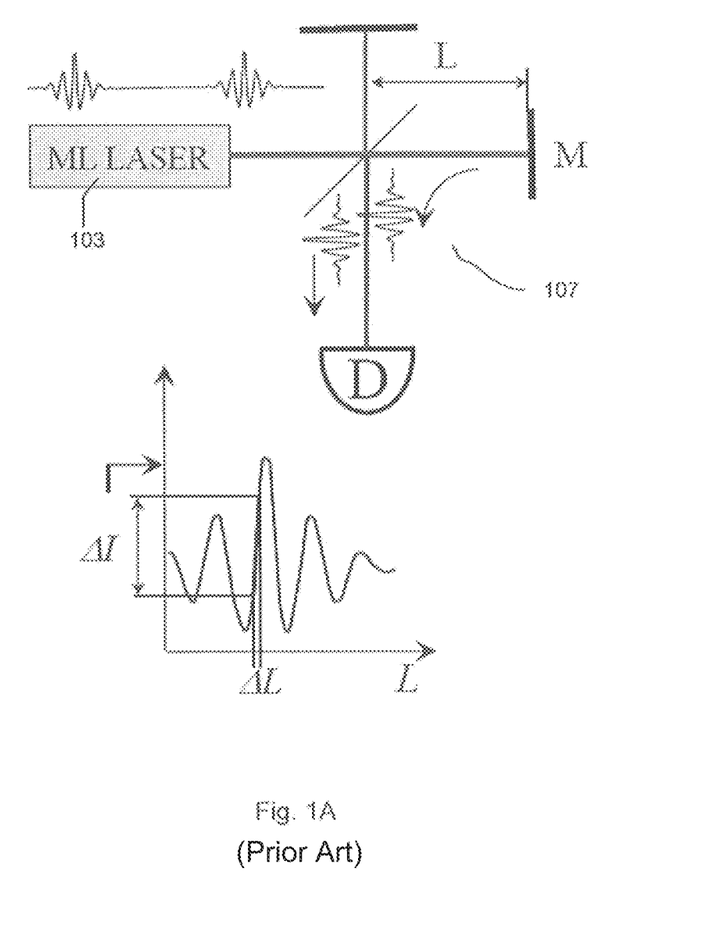
FIGS. 1A and 1B show a comparison of classical interferometry and intracavity phase interferometry.
Figure 1B:
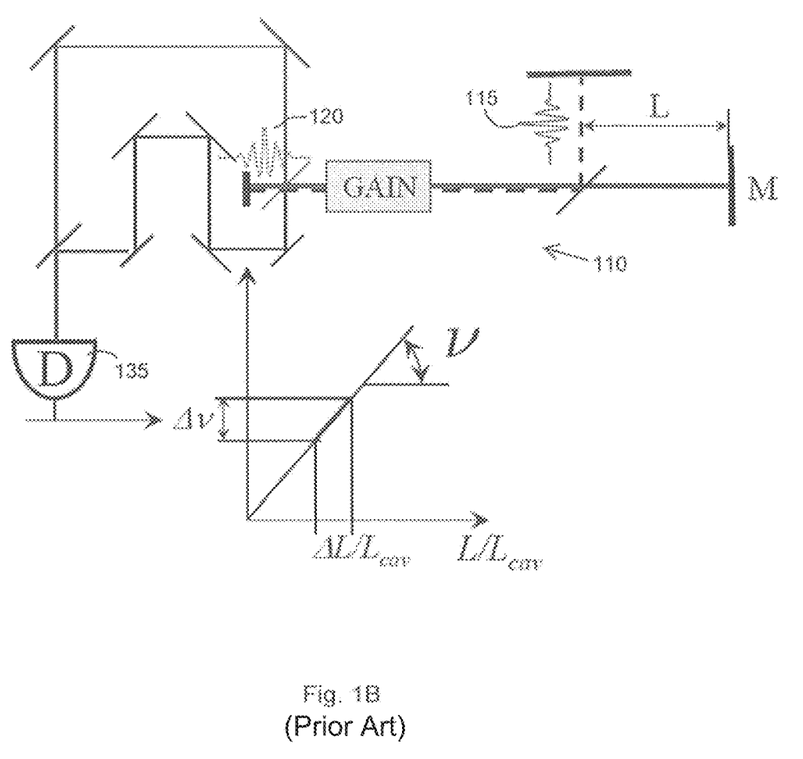

FIGS. 1A and 1B show a comparison of classical interferometry and intracavity phase interferometry. FIG. 1A illustrates a mode-locked laser 103 used in a classical Michelson interferometry. Mode-locked laser 103 produces a train of identical ultrashort optical pulses. The train of optical pulses is directed onto a Michelson interferometer 107 having two arms, made of a "reference" and "signal" arm terminated by the mirror M. The position of the mirror M may be determined by monitoring the amplitude of the interference fringes with the detector D. The successive constructive/destructive interferences recorded as the length L is being varied give, within a certain range, a change in intensity ΔI proportional to the elongation ΔL. At the point of steepest slope in FIG. 1A, to the smallest measurable intensity difference ΔI, as limited by amplitude noise, corresponds a minimum elongation $\Delta L \sim \lambda \Delta I/(2\pi I)$. Laser amplitude stability as well as detector amplitude noise can set the limit of the resolution to a fraction of wavelength.

FIG. 1B illustrates a mode-locked laser cavity 110 used in a linear laser implementation of IPI. A measurement similar to that of FIG. 1A is performed inside mode-locked laser cavity 110 in which two pulses 115 and 120 are circulating simultaneously inside laser cavity 110. One of the intracavity pulses, 120, is diverted towards the "reference arm," while the other pulse, 115, is directed towards the mirror M of the "signal arm." Since these two arms are part of the laser, the pulse circulating in the reference cavity will have a different frequency than the pulse circulating in the signal cavity. Detection is made by extracting, from the laser cavity 110, the pulse trains corresponding to each of the intracavity pulses, giving them a relative delay such as to make them overlap on a detector 135. The signal obtained by making the two pulse trains 115 and 120, extracted from the laser, interfere on a detector 135 has a frequency $\Delta v$ proportional to the elongation relative to the cavity length $L_{cav}$. The proportionality constant is the optical frequency $v$.

Detector 135 will record an alternative signal, at a frequency proportional to the difference in optical frequency between the signal and reference. As the length of the signal arm L is being scanned, the measured quantity, which is a frequency rather than an amplitude, will vary linearly. This frequency $\Delta v$, called generally "beat frequency", is equal to the product of the optical frequency of the laser by the displacement relative to the cavity length $L_{cav}$: $\Delta v = v \Delta L/L_{cav}$. The smallest optical length change $\Delta L$ that can be measured $\Delta L = L_{cav} \Delta v/v$ is determined by the smallest measurable beat note. The two pulse trains are correlated, which explains that, even in the case of un-stabilized lasers, beat note bandwidths as narrow as 0.2 Hz have been recorded. The sensitivity of the intracavity measurement is thus typically seven to eight orders of magnitude better than that of the Michelson measurement. The elongation precision of the order of one femtometer, which corresponds to a 0.2 Hz beat note bandwidth, is considerably smaller than the surface irregularities of the mirrors.

Figure 2:
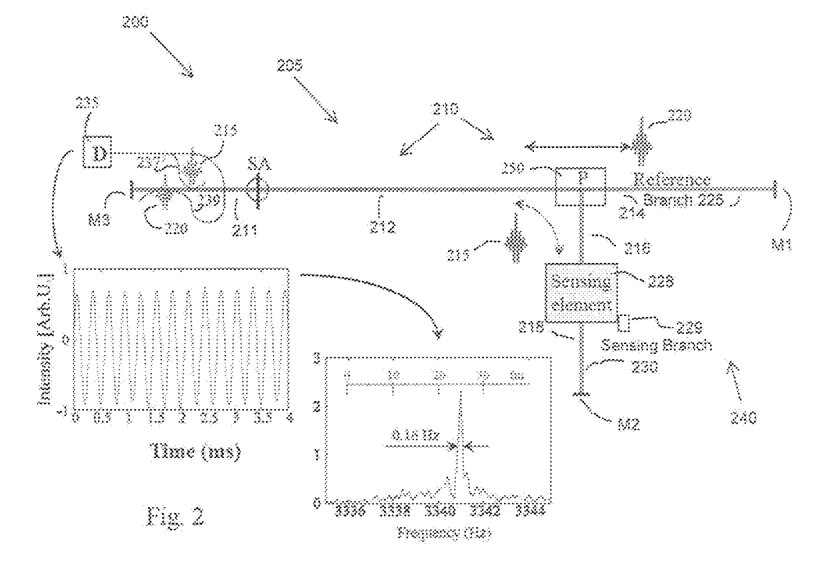
FIG. 2 illustrates operation of an embodiment of an example polarization maintaining mode-locked fiber laser in an intracavity phase interferometry arrangement.

FIG. 2 illustrates operation of an embodiment of an example polarization maintaining (PM) mode-locked fiber laser 205 in intracavity phase interferometry arrangement 200. Mode-locked fiber laser 205 can include a laser cavity 210, a resonator 240 disposed in laser cavity 210, and a gain medium disposed in laser cavity 210. Laser cavity 210 can be structured with polarization-preserving fibers 211, 212, 214, 216, and 218 configured to propagate two orthogonal polarized modes, signals 215 and 220. The gain medium may be distributed in one or more of polarization-preserving fibers 211, 212, 214, 216, and 218. The gain medium can include erbium.

Resonator 240 disposed in laser cavity 210 can have a reference branch 225, also referred to as reference arm 225, and a sensor branch 230, also referred to as a sensing arm 230. Resonator 240 can include mirror M1, mirror M2, polarization-preserving fiber 214 in reference arm 225, polarization-preserving fibers 216 and 218 in sensor branch 230, a mount 229 to which a sensing element 228 can be coupled in sensor branch 230. Reference branch 225 can be configured to propagate one (signal 220) of the two orthogonal polarized modes. Sensor branch 230 can be configured to propagate the other one (signal 215) of the two orthogonal polarized modes through sensing element 228 when coupled to mount 229. In an embodiment, mount 229 and sensing element 228 may constitute an integrated unit such as a resonator mirror, for example M2, in the sensing branch that can be modified by a stimulus. The two signals 215 and 220 can be directed to resonator 240 by a polarizing beam splitter 250 to direct the propagation of signal 220 into reference branch 225 and the propagation of signal 215 into sensor branch 230. Outside resonator 240, signal 215 and 220 propagate in the main portion of laser cavity 210 that is terminated at an end opposite resonator 240 by mirror M3. Resonator 240 can be configured as a Michelson type interferometer.

The gain medium disposed in laser cavity 210 can be arranged with a mode locking device disposed in laser cavity 210 to operate the fiber laser 205 in pulsed mode providing signals 215 and 220 as pulses. The mode locking device can be a saturable absorber, SA. Saturable absorber SA can be implemented to circulate the two pulses independently in the laser cavity 210. Saturable absorber SA can be realized as a portion of a tapered fiber, coated with carbon nanotubes.

Arrangement 200 can include a detector 235 configured to receive pulse trains emitted by the fiber laser 205 operating in double pulse mode such that the pulse trains interfere on the detector 235. Signal 215 can be coupled to detector 235 by an optical coupler 237, and signal 220 can be coupled to detector 235 by an optical coupler 239. As shown in FIG. 2, intensity received at detector 235 can translate to a frequency having a small full width at half maximum (FWHM). In FIG. 2, the FWHM value is 0.16 Hz. The interference on detector 235 can allow measurement of a physical quantity that modifies optical lengths of cavity 210. Sensing element 228 can have a configuration that modifies an optical path length of the sensor branch 230 in response to a stimulus to sensing element 228. The stimulus can include one or more of an electric field stimulus, a magnetic field stimulus, a linear index of refraction stimulus, a nonlinear index of refraction stimulus, biological substances attached on the polarization-preserving fiber in the sensor branch, temperature changes, or other stimulus.

Mode-locked fiber lasers are the most promising tool for creating two independent pulses circulating in the same cavity without interaction. The use of polarization preserving fibers can enable the circulation of two pulses orthogonally polarized in the cavity, with a crossing point that can be defined by a saturable absorber. Such a saturable absorber can be realized by a carbon nanotube saturable absorber. With pulses cross polarized and a saturable absorber distributed over a tapered section, backscattering can be reduced, which can mitigate the risk of phase coupling between counter-propagating pulses in a ring configuration for example. An all-polarizing maintaining fiber mode-locked lasers may provide an unprecedented long term stability and robustness against any manipulation of the fibers. By contrast, fiber lasers built with non-polarization preserving single mode fibers are extremely sensitive to any change in position and temperature of the fiber. Since the frequencies to be measured vary from sub Hz to the value of the repetition rate (0.3 GHz for a 50 cm linear cavity), the system having fiber lasers built with non-polarization preserving fibers provides nine orders of magnitude in dynamic range of detection.

Figure 3:
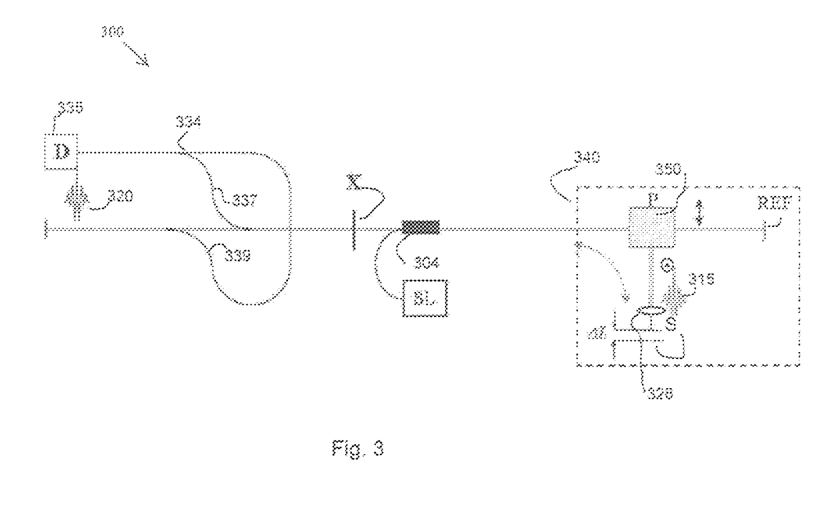
FIG. 3 illustrates a topology of a fiber laser sensor.

FIG. 3 illustrates a topology 300 of a fiber laser sensor. Two pulses 315 and 320 are made to oscillate in a cavity made of polarization maintaining fibers, one propagating on the slow axis, and the other on the fast axis. A saturable absorber X is located at a crossing point both for mode-locking and for imposing the pulse crossing point of the two pulses. At the right end of the cavity is a intracavity sensor interferometer 340 with a reference (REF) mirror and a sample mirror (S). A polarizing beam splitter P 350 separates the two pulses, one 320 being sent to a reference arm providing a reference cavity, the other 315 to the arm with the sensing element 328 providing a probe cavity. On the left side of the cavity, output couplers 337, 339 and beam combiner 334 make the two output pulse trains (corresponding to each intracavity pulse) interfere on a detector D 335, which can be a beat note detector, recording the interfering of the two output pulse trains corresponding to each intracavity pulse. The topology can include a semiconductor laser SL 304 to pump a gain section in the laser cavity. The semiconductor laser SL 304 can be a pump laser selected for an erbium gain fiber.

Topology 300 exploits the ability of a laser with polarization preserving fibers to operate simultaneously in two orthogonal modes. The polarization preserving fiber laser is terminated on the left end by a 100% reflector, while at the other side the two polarizations are branched off by using a fiber coupled polarization beam splitter 350 leading to two separate branches, terminated each by a total reflector. Mode-locking can be achieved with a saturable absorber X, which will also be one of the meeting point of the two pulses circulating in the resonator. Since the polarizations are orthogonal, there are no standing waves, and the mutual saturation is only twice the self-saturation rather than three times the self-saturation, as is the case in parallel polarization. Two optical couplers 337, 339 in the main common branch of the cavity provide an output port for the orthogonally polarized pulses. The pulses will beat together on optical detector D 335 using two external polarizing beam splitters, and an optical delay to adjust the arrival time of one pulse relative to the other at the photodetector for optimum overlap.

The signal on the detector D 335 has a modulation (beat note) at a frequency $\Delta\nu=\Delta(kl)/(2\pi\tau_{rt})$ proportional to the difference in optical path between the two branches. It should be noted that the sensitivity to the measurement is inversely proportional to the cavity round-trip time, $\tau_{rt}$. Short cavities are desirable for stability (narrower beat note bandwidth) but also for sensitivity. Indeed the slope of the response $\Delta\nu/\Delta(kl)$ is inversely proportional to the cavity length $c\tau_{rt}$.

Since the quantity that is being measured is a frequency, it is to first order insensitive to amplitude fluctuations. The noise improvement over traditional fiber sensing is the same as the one experienced with the transition from AM radio to FM radio.

Other considerations may include creating a double cavity laser, group delay matching, dead band, and nonlinear effects. With respect to creating a double cavity laser, it has been shown that a fiber laser can be pumped and operate continuously above threshold for the two orthogonal polarizations. For pulsed operation, it is essential that the two orthogonally polarized circulating pulses have the same round-trip time, which requires that the optical length of the cavity be the same within a fraction of the pulse length. The length adjustment may involve a free space portion in one arm of the interferometer 340 of FIG. 3 or involve the whole interferometer 340 located be in free space.

With respect to group delay matching, in configurations using polarization preserving fibers, there will be a difference in phase and group velocities for the two pulses. The difference in phase velocity causes a bias beat note, which will have to be calibrated for zero magnetic field, in the case of magnetic field sensing. One function of the saturable absorber in FIG. 3 is to lock the crossing point—hence the repetition rate—of the two orthogonally polarized pulses. When the difference in group delay for the two polarization becomes too large for this "locking" to occur, sections of fibers can be spliced together with the fast and slow axis interchanged.

With respect to dead band, it has been shown that very small backscattering at the meeting point of the two pulses can lock the carrier frequency of the two pulse trains, thus eliminating the beat note. In the case of a dye jet saturable absorber, the mutual (phase) coupling is negligible because the phase of the backscattering is randomized by the transverse motion of the dye jet. In the case of the laser with polarization preserving fibers, the saturable absorber being coupled by evanescent wave on a tapered section of the fiber, there should be little or no backscattering. Furthermore, there is no phase locking possible through backscattering if the two beams are exactly orthogonally polarized.

There is a possibility that a dead band may appear if there is a large leakage of one polarization into the other. The technique of electro-optic dithering can eliminate an eventual dead band and bias beat note. It consists in mixing an electronic signal synchronous with the repetition rate of the laser with a lower frequency square wave. The output of the mixer will be a sine wave changing phase by 180 degrees at each half cycle of the square wave, resulting in an "unlocked" beat note of zero bias.

With respect to nonlinear effects, mode-locked fiber laser-amplifiers are routinely operating at 100 mW, 40 MHz, 100 fs without damage to the single mode fiber. The fiber laser of FIG. 3, for example, can be expected to operate at one mW average power, 500 fs pulse duration at a repetition rate of 100 MHz, which corresponds to a pulse energy of 10 pJ, and a peak power of 20 W. For a typical mode size of 10 micron for the PM fiber, that corresponds to a peak intensity of ~12 MW/cm$^2$. Taking for the nonlinear index coefficient $n_2=3\cdot10^{-16}$ cm$^2$/W, a nonlinear k-vector $\Delta k=0.00015$ cm$^{-1}$ can occur. Intensity fluctuation will limit the ultimate sensitivity. If a sensor section in a 10 cm long fiber is desired, and the fluctuation in the difference in intensity between probe and reference does not exceed $10^{-4}$, the phase sensitivity will be limited to 10-7. To achieve a better resolution, specialty fibers with a larger mode size and a lower (nonlinear) index can be used. An alternate method is to make the detection interferometer from free space components, using a fiber collimator, optionally provided as fiber collimator 499 before the polarizing beam splitter 450 in FIG. 4. It should be noted that, since the intensity fluctuations of the two pulses are correlated, the nonlinear effects in the common fiber section do not affect the beat note.

Controlling pulse timing by pulsing gain is conceptually the ideal configuration of IPI. The pulse crossing point can be controlled by the timing of the gain, without any phase coupling between the two pulses that are being generated. Ultrashort gain pulses can be obtained by nonlinear optics, difference frequency generation, or optical parametric oscillation (OPO). The optical parametric oscillator, synchronously pumped by a mode-locked laser, may offer the ideal solution in which the lifetime of the gain is equal to the duration of the pump pulse, the crossing point of the two pulses generated in the OPO cavity can be determined by optical delays applied to pump pulses, and the group velocity of the two pulses is dictated by the pump pulse repetition rate. Implementation of such an arrangement with discrete laser elements lasers has been remarkably difficult and full of surprises that reveal subtle intricacies of IPI.

Figure 4:
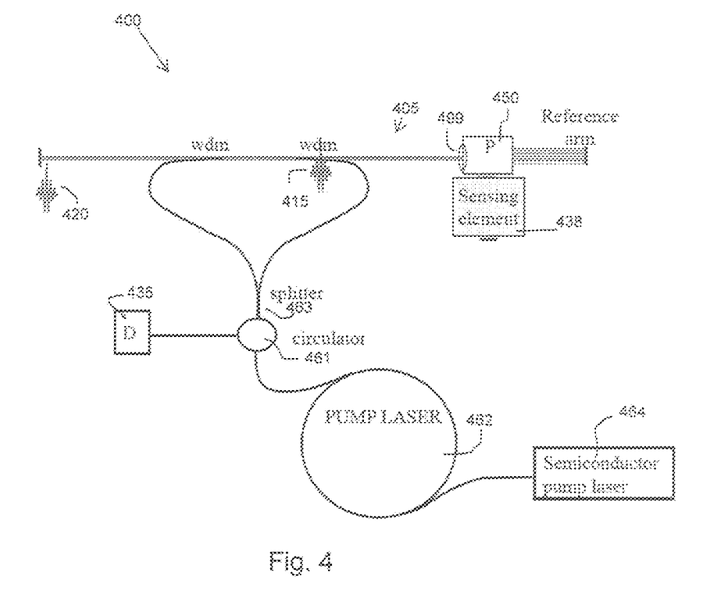
FIG. 4 illustrates an apparatus having an optical parametric oscillation fiber sensor.

FIG. 4 illustrates an apparatus 400 having an optical parametric oscillation fiber sensor. Apparatus 400 comprises an OPO 405 having fiber that constitute in essence gain medium, which can be pumped by short pulses from the pump laser 462. OPO 405 can include a resonator disposed therein. Apparatus 400 can provide a linear OPO IPI, where pump pulses are to be sent in the slow and fast axis of the linear fiber cavity of OPO 405. The fiber cavity of OPO 405 can be structured with polarization-preserving fibers configured to propagate two orthogonal polarized modes. The resonator can have a reference branch and a sensor branch. The reference branch can include polarization-preserving fiber and the reference branch can be configured to propagate one of the two orthogonal polarized modes. The sensor branch can include polarization-preserving fiber. The sensor branch can include a mount to hold a sensing element and can be configured to propagate the other one of the two orthogonal polarized modes through the sensing element when coupled to the mount. In an embodiment, the mount and sensing element may constitute an integrated unit such as a resonator mirror in the sensing branch that can be modified by a stimulus. The resonator can be configured as a Michelson type interferometer. In some embodiments, some elements of the resonator (interferometer) may be discrete components. As noted above, the detection interferometer may be realized implementing free space components such as using fiber collimator 499 before the polarizing beam splitter 450.

Pump laser 462 can be configured to create pulses in OPO 405 such that two pulses circulate in the cavity of OPO, the two pulses being polarized orthogonal to each other. A semiconductor pump laser 464 can be coupled to pump laser 462 operable as a pump laser to provide laser signal to OPO 405.

Apparatus 400 can include a detector 435 configured to receive pulse trains from OPO 405 operating in double pulse mode such that the pulse trains interfere on detector 435. Apparatus 400 can include a circulator 461 to couple pulses from pump laser 462 to OPO 405 and to couple the pulse trains from OPO 405 to detector 435. With circulator 461 coupled to detector 435, circulator 461 can be coupled to OPO 405 by a splitter 463 coupling two fibers to the OPO cavity. These two fibers can be coupled to the main cavity of the cavity of OPO 405 by wavelength division multipliers (WDMs). Various of the components of apparatus associated with FIGS. 2 and 3 can be implemented in apparatus similar or identical to apparatus 400. Additionally, components of apparatus 400 can be implemented in apparatus similar or identical to apparatus of FIGS. 2 and 3.

The detector provides a mechanism to measure a physical quantity associated with an optical length of the cavity of the OPO 405 that can be modified. The sensing element can have a configuration that modifies an optical path length of the sensor branch in response to a stimulus to the sensing element. The stimulus can include one or more of an electric field stimulus, a magnetic field stimulus, a linear index of refraction stimulus, a non-linear index of refraction stimulus, biological substances attached on the polarization-preserving fiber in the sensor branch, temperature changes, or other stimulus.

Figure 5:
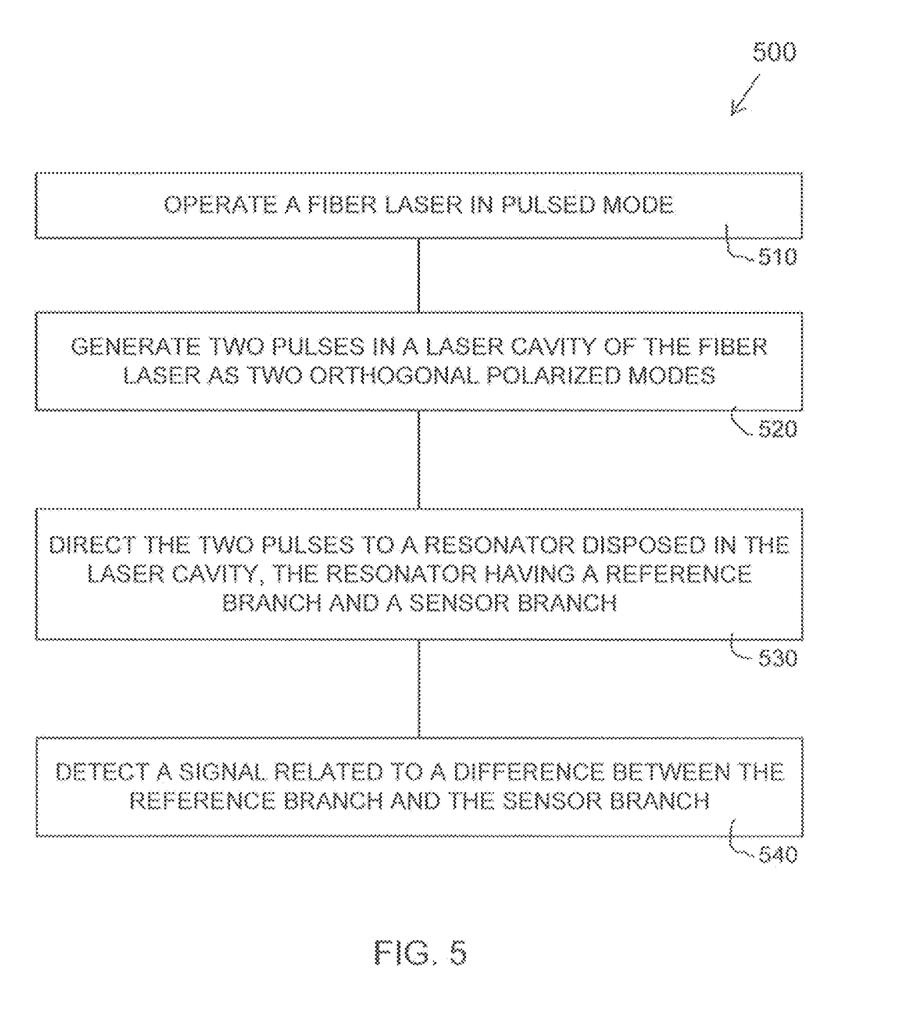
FIG. 5 illustrates features of an embodiment of a method using a fiber laser.

FIG. 5 illustrates features of an embodiment of a method 500 using a fiber laser. At 510, a fiber laser is operated in pulsed mode. Operating the fiber laser can include operating a fiber laser, having a laser cavity, in pulsed mode using a gain medium disposed in the laser cavity with the gain medium arranged with a mode locking device disposed in the laser cavity. The mode locking device can be a saturable absorber arranged to circulate the two pulses independently in the laser cavity.

At 520, two pulses are generated in a laser cavity of the fiber laser as two orthogonal polarized modes. Generating the two pulses in the laser cavity can include generating two pulses in the laser cavity, where the laser cavity is structured with polarization-preserving fibers configured to propagate the two pulses simultaneously as two orthogonal polarized modes.

At 530, the two pulses are directed to a resonator disposed in the laser cavity, the resonator having a reference branch and a sensor branch. Directing the two pulses to the resonator can include directing the two pulses to the resonator disposed in the laser cavity such that one pulse of the two pulses propagates in polarization-preserving fiber in the reference branch and the other pulse of the two pulses propagates through polarization-preserving fiber in the sensor branch and through a sensing element coupled to a mount in the sensor branch. The resonator can be configured as a Michelson type interferometer. Directing the two pulses to the resonator can include using a polarizing beam splitter to direct the propagation of the one pulse into the reference branch and the propagation of the other pulse into the sensor branch At 540, a signal related to a difference between the reference branch and the sensor branch is detected. Detecting the signal can include detecting a signal at a frequency proportional to a difference in optical length of the reference branch and the sensor branch in response to the two pulses interfering on a detector. Detecting the signal can be based on a stimulus applied to the sensing element modifying an optical path length of the sensor branch. The stimulus can include one or more of an electric field stimulus, a magnetic field stimulus, a linear index of refraction stimulus, a non-linear index of refraction stimulus, biological substances attached on the polarization-preserving fiber in the sensor branch, or temperature changes, or other stimulus.

Figure 6:
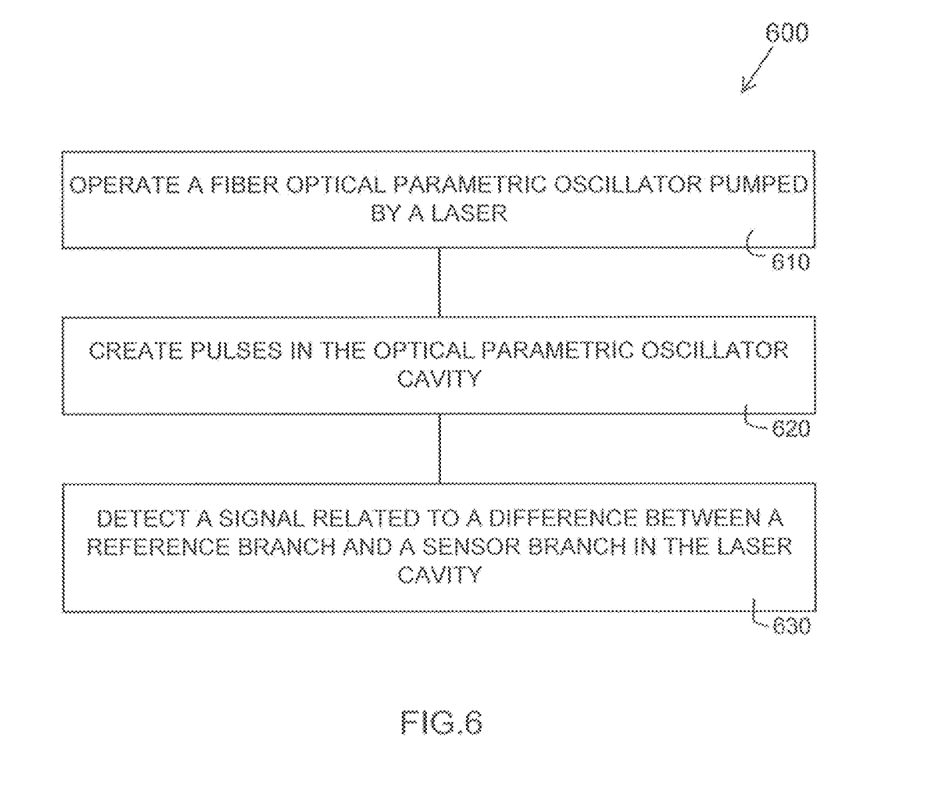
FIG. 6 illustrates features of an embodiment of a method using a fiber optical parametric oscillator.

FIG. 6 illustrates features of an embodiment of a method 600 using a fiber optical parametric oscillator. At 610, a fiber optical parametric pumped by a laser is operated. The laser may be a fiber laser. The laser may be a pump laser pumped by a semiconductor pump laser. The fiber optical parametric oscillator can include: an OPO cavity structured with polarization-preserving fibers configured to propagate two orthogonal polarized modes; and a resonator disposed in the OPO cavity, the resonator having a reference branch and a sensor branch. The reference branch can include polarization-preserving fiber, and the reference branch can be configured to propagate one of the two orthogonal polarized modes. The sensor branch can include a mount to hold a sensing element and polarization-preserving fiber, and the sensor branch can be configured to propagate the other one of the two orthogonal polarized modes through the sensing element when coupled to the mount. Operating the fiber optical parametric oscillator coupled to the pump laser can include using a circulator to couple the pulses from the pump laser to the fiber optical parametric oscillator and using the circulator to couple pulse trains from the fiber optical parametric oscillator to the detector.

At 620, pulses are created in the optical parametric oscillator cavity. Pulses can be created in the cavity of the fiber optical parametric oscillator such that two pulses circulate in the OPO cavity with the two pulses being polarized orthogonal to each other. At 630, a signal related to a difference between a reference branch and a sensor branch in the OPO cavity is detected. Detecting the signal can include detecting a signal at a frequency proportional to a difference in optical path length of the reference branch and the sensor branch in response to the two pulses interfering on a detector. Detecting the signal can be based on a stimulus applied to the sensing element modifying an optical path length of the sensor branch. The stimulus can include one or more of an electric field stimulus, a magnetic field stimulus, a linear index of refraction stimulus, a non-linear index of refraction stimulus, biological substances attached on the polarization-preserving fiber in the sensor branch, and temperature changes, or other stimulus.

In various embodiments, intracavity phase interferometry can be implemented with mode-locked fiber lasers. A sensing element can be located in the cavity of the mode-locked fiber laser. Arrangements can include a fiber optical parametric oscillator having a sensing element located in the cavity of the optical parametric oscillator, where the optical parametric oscillator can be coupled with a pump laser to provide independent propagating pulses. In these various arrangements, a physical quantity to be measured is translated into a frequency. Features of any of methods or other combinations of structural features, as taught herein, may be combined into a procedure according to the teachings herein. In addition, various topologies for a fiber laser sensor can be implemented by combining various components as taught herein.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of various embodiments of the invention. Various embodiments can use permutations and/or combinations of embodiments described herein. Other embodiments will be apparent to those skilled in the art from consideration of the specification and practice of the embodiments disclosed herein. It is to be understood that the above description is intended to be illustrative, and not restrictive, and that the phraseology or terminology employed herein is for the purpose of description.

What is claimed is:

1. An apparatus comprising:
    a fiber laser including:
        a laser cavity structured with polarization-preserving fibers configured to propagate two orthogonal polarized modes;
        a resonator disposed in the laser cavity, the resonator having a reference branch and a sensor branch, the reference branch including polarization-preserving fiber of the polarization-preserving fibers, the reference branch configured to propagate one of the two orthogonal polarized modes, the sensor branch including a mount to hold a sensing element and polarization-preserving fiber of polarization-preserving fibers, the sensor branch configured to propagate the other one of the two orthogonal polarized modes through or to the sensing element when coupled to the mount; and
        a gain medium disposed in the laser cavity and arranged with a mode locking device disposed in the laser cavity to operate the fiber laser in pulsed mode; and
    a detector to detect and process a signal correlated to the two orthogonal polarized modes in response to a stimulus applied to the sensing element, modifying an optical path length of the sensor branch.

2. The apparatus of claim 1, wherein the mode locking device is a saturable absorber.

3. The apparatus of claim 1, wherein the apparatus includes the detector configured to receive pulse trains emitted by the fiber laser operating in double pulse mode such that the pulse trains interfere on the detector.

4. The apparatus of claim 1, wherein the stimulus includes one or more of an electric field stimulus, a magnetic field stimulus, a linear index of refraction stimulus, a non-linear index of refraction stimulus, biological substances attached on the polarization-preserving fiber in the sensor branch, or temperature changes.

5. The apparatus of claim 1, wherein the apparatus includes a semiconductor pump laser disposed in the laser cavity, the semiconductor pump laser configured to pump the gain medium, the gain medium including erbium.

6. The apparatus of claim 1, wherein the resonator is configured as a Michelson type interferometer.

7. A method comprising:
    operating a fiber laser, having a laser cavity, in pulsed mode using a gain medium disposed in the laser cavity with the gain medium arranged with a mode locking device disposed in the laser cavity;
    generating two pulses in the laser cavity, the laser cavity structured with polarization-preserving fibers configured to propagate the two pulses simultaneously as two orthogonal polarized modes;
    directing the two pulses to a resonator disposed in the laser cavity, the resonator having a reference branch and a sensor branch, such that one pulse of the two pulses propagates in polarization-preserving fiber of the polarization-preserving fibers in the reference branch and the other pulse of the two pulses propagates through polarization-preserving fiber of the polarization-preserving fibers in the sensor branch and through a sensing element coupled to a mount in the sensor branch; and
    detecting a signal correlated to a stimulus applied to the sensing element, modifying an optical path length of the sensor branch, at a frequency proportional to a difference in optical length of the reference branch and the sensor branch in response to the two pulses interfering on a detector.

8. The method of claim 7, wherein the mode locking device is a saturable absorber arranged to circulate the two pulses independently in the laser cavity.

9. The method of claim 7, wherein the stimulus includes one or more of an electric field stimulus, a magnetic field stimulus, a linear index of refraction stimulus, a non-linear index of refraction stimulus, biological substances attached on the polarization-preserving fiber in the sensor branch, or temperature changes.

10. The method of claim 7, wherein the resonator is configured as a Michelson type interferometer.

11. The method of claim 7, wherein directing the two pulses to the resonator includes using a polarizing beam splitter to direct the propagation of the one pulse into the reference branch and the propagation of the other pulse into the sensor branch.

* * * * *

UNITED STATES PATENT AND TRADEMARK OFFICE
CERTIFICATE OF CORRECTION

PATENT NO. : 9,726,472 B1  
APPLICATION NO. : 14/552016  
DATED : August 8, 2017  
INVENTOR(S) : Diels et al.

Page 1 of 1

It is certified that error appears in the above-identified patent and that said Letters Patent is hereby corrected as shown below:

On the Title Page

In Column 2, item (56), under "Other Publications", Line 1, delete "webs" and insert --wells-- therefor On page 3, in Column 1, item (56), under "Other Publications", Line 4, delete "Measuremeent" and insert --Measurement-- therefor On page 3, in Column 1, item (56), under "Other Publications", Line 5, delete "Celsium" and insert --Cesium-- therefor On page 3, in Column 1, item (56), under "Other Publications", Line 13, delete ""Instaboilities" and insert --"Instabilities-- therefor In the Claims In Column 10, Line 36, in Claim 7, after "through", insert --or to--

Signed and Sealed this  
Sixteenth Day of July, 2019

Andrei Iancu  
*Director of the United States Patent and Trademark Office*